Jan. 18, 1966  A. E. SEDEVIE  3,229,666
STOCK CONTROL GATE
Filed July 6, 1964
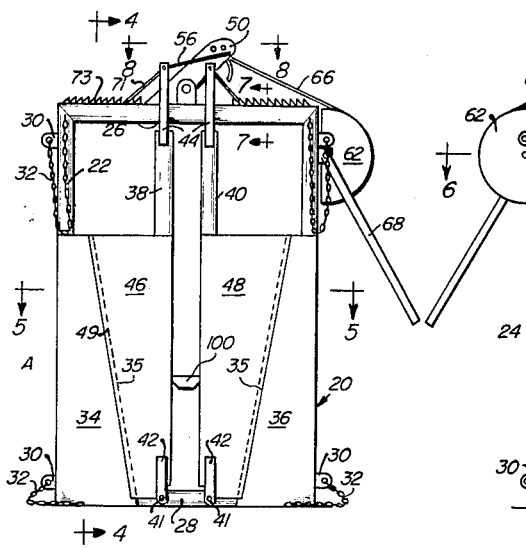
FIG. 1
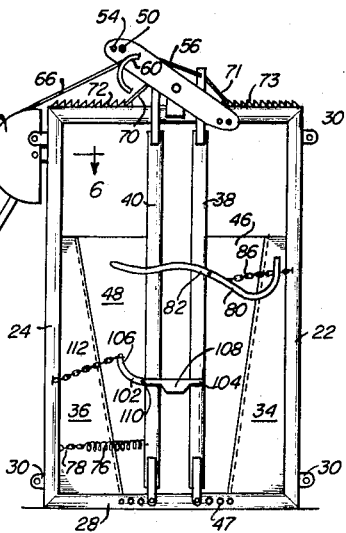
FIG. 2
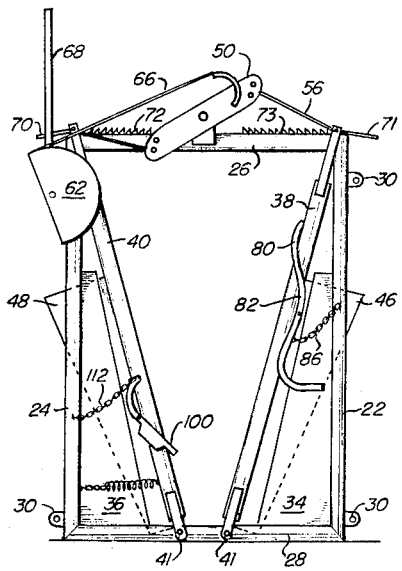
FIG 3
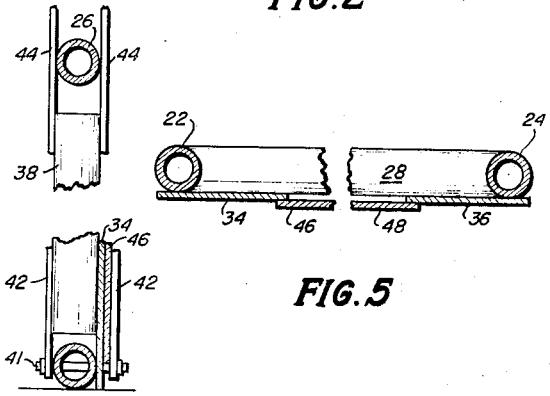
FIG. 4   FIG. 5
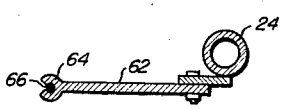
FIG. 6
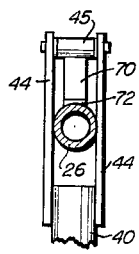
FIG. 7   FIG. 9
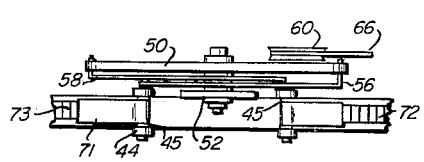
FIG. 8
INVENTOR.
ALLEN E. SEDEVIE
BY
ATTORNEY

United States Patent Office 3,229,666
Patented Jan. 18, 1966

3,229,666
STOCK CONTROL GATE
Allen E. Sedevie, Bowman, N. Dak.
Filed July 6, 1964, Ser. No. 380,591
3 Claims. (Cl. 119—98)

This application is a continuation-in-part of my application entitled Stock Control Gate, filed Sept. 24, 1963, bearing Ser. No. 311,069 now abandoned.

This invention relates to improved apparatus for restraining and controlling stock, and more particularly, but not necessarily exclusively, to improved apparatus of this type including means for rapidly closing the gate members to facilitate the efficient handling of stock of all kinds.

The general object of the invention is to improve stock control gate apparatus. Other objects of the invention are: to provide improved stock control gate apparatus including means for rapidly closing the gate members upon an animal; to provide improved apparatus of this type including means for latching the gate in a stock engaging position; to provide improved apparatus of this character including means for controlling the vertical displacement of an animal held in place by the stock control gate members; to provide improved apparatus of this type including means for preventing an animal from sticking its feet through the gate member section of the apparatus while it is being held in place by the gate members; to provide improved apparatus of this type including means for removably mounting the device within a chute or other suitable location; and in general, to provide an improved stock control gate which is highly versatile and dependable in operation, simple and inexpensive to construct, and rugged and long wearing in service.

The foregoing and other objects and advantages of the invention will become apparent in the following detailed description of a representative embodiment thereof, taken in conjunction with the drawing wherein:

FIGURE 1 is a rear elevation view of the invention showing the stock engaging members in a closed stock control position;

FIGURE 2 is a front elevation view of the structure shown in FIGURE 1;

FIGURE 3 is a front elevation view of the invention showing the stock engaging members in an open stock release position;

FIGURE 4 is an enlarged view, partially in section and with parts removed to indicate length, taken on the line 4—4 of FIGURE 1;

FIGURE 5 is an enlarged view, partially in section and with parts removed to indicate length, taken on the line 5—5 of FIGURE 1;

FIGURE 6 is an enlarged fragmentary view, partially in section, taken on the line 6—6 of FIGURE 2;

FIGURE 7 is an enlarged fragmentary view, partially in section, taken on the line 7—7 of FIGURE 1;

FIGURE 8 is an enlarged fragmentary view, partially in section, taken on the line 8—8 of FIGURE 1; and FIGURE 9 is a fragmentary view of one of the parts making up the invention.

Stock restraining devices found in common use throughout the western United States are of several different types and are provided with closure means of varying detail. The present invention provides apparatus which successfully overcomes substantially all of the disadvantages and inefficiencies of previous devices, and which includes means for rapidly closing a pair of pivotal gate members upon the opposed sides of an animal's neck without requiring a large crew of men to manipulate the device or the animal, thus insuring that the work performed upon the animal will be done in a minimum of time and with a minimum of trouble.

The practice of the present invention takes advantage of the symmetry inherent in all animals and uses a centrally mounted link plate to transmit rotational forces to a pair of opposed pivoted gate members to move them toward or away from the animal simultaneously whereby to engage and restrain the animal from longitudinal or lateral movements. Additional hinged members are provided to limit the vertical movement of the animal's head and neck while it is being restrained.

Referring now to the drawings, the invention, indicated in its entirety by the reference character A, is shown in FIGURES 1–3 as including an upright frame 20 having vertical side members 22, 24 and top and bottom members 26, 28, respectively formed of suitable tubing or pipe stock. Brackets 30 are attached adjacent the top and bottom of side members 22, 24 to permit the securing of frame 20 within a cattle chute (not shown) by means of, for example, chain members 32, as shown in FIGURE 1. Secured to side members 22, 24 and extending within frame 20 are fixed panel sections 34, 36 which have inner edges 35 that are inclined upwardly and outwardly from bottom member 28 to cover a generally triangular portion of the space adjacent side members 22, 24 within frame 20, as indicated by the dotted lines in FIGURES 1 and 2.

A pair of elongated stock engaging members 38, 40 are pivotally mounted, as at 41, by means of lower strap members 42, to bottom member 28. Members 38, 40, which may be of tubular construction, are spaced equidistantly on each side of the central vertical axis of frame 20 between side members 22, 24 and are equipped at their upper ends with a pair of spaced strap member extensions 44 which surround and extend above top member 26. Each pair of extensions 44 are connected above top member 26 by means of links 45, as shown in FIGURE 8. Panel sections 46, 48, which are secured to members 38, 40, respectively, have outer edges 49 that are inclined downwardly and inwardly in generally parallel overlying relationship to edges 35 of panel sections 34, 36 whereby to fill in the space within frame 20 between members 38, 40 and edges 35 when members 38, 40 are in the closed stock engaging position shown in FIGURES 1 and 2. A series of laterally spaced holes 47 are drilled through bottom member 28 adjacent member 40 to permit the lateral adjustment of the spacing between members 38, 40 by moving pivotal connection 41 (which may be a pin or bolt type of connection) thereto.

Further provided is a link plate 50 that is pivotally mounted on bracket 52 for rocking movement in a vertical plane about a horizontal axis that is slightly above top member 22 and between members 38, 40. As shown in FIGURES 1–3, bracket 52 is carried by top member 22 at its mid point. The end portions of link plate 50 are drilled, as at 54, to pivotally receive slender elongated rigid connectors 56, 58 which are pivotally secured at their opposite ends to extensions 44 and links 45 of members 38, 40, respectively. Link plate 50 is equipped with a semi-circular upwardly grooved cable anchor 60 which is secured adjacent an end thereof outwardly of frame 20. Secured to side member 24 of frame 20 and mounted thereon for limited rotary movement about a horizontal axis slightly below top member 26 is a semi-circular pulley structure 62 having a cable groove 64. Connecting cable anchor 60 on link plate 50 with pulley structure 62 is a flexible cable member 66. A radially extending handle 68 is secured to pulley structure 62 which permits the rapid transmission of rotary movement to link plate 50 whereby to move members 38, 40 towards each other into the stock engaging position shown in FIGURES 1 and 2 from the stock release position shown in FIGURE 3.

To lock members 38, 40 into the spaced parallel relationship shown in FIGURES 1 and 2, a latching means is employed. This means includes a pawl member 70 that is rotatably mounted upon link 45 of member 40 and a series of ratchet teeth 72 constituting a ratchet rack on the upper surface of top member 26 between pulley structure 62 and link plate 50. Means for normally biasing members 38, 40 into the open stock release position of FIGURE 3 includes a strong tension spring member 76 that is secured at one end to member 40 in spaced relation to pivot connection 41 and at the other end to a short chain member 78 that is attached to side member 20.

As shown in FIGURES 2, 3 and 9, a curved upper restraining bar 80 is pivoted intermediate its ends on member 38 for swinging movements across the space between members 38 and 40 of frame 20. The purpose of bar 80 is to limit the upward movement of the animal between members 38, 40. As shown in FIGURE 9, bar 80 is characterized by an elongated body 81 having a downwardly concave portion 82 extending along its middle and an upwardly concave portion 83 adjacent an end 84 thereof. Bar 80 is pivotally carried by means of a pin or bolt 85 upon member 38 so that it can be swung from the animal engaging generally horizontal position shown in FIGURE 2 to the generally vertical animal release position shown in FIGURE 3. When in the position of FIGURE 2, surface 82 of bar 80 is adapted to rest upon the neck of the animal. A chain tension member 86 is secured at one end to the side member 22 and at the other end to bar 80 between bolt 85 and the concave surface 83. The length of chain 86 is such that when members 38, 40 are swung into the closed position of FIGURE 2 the bar 80 will pivot about the axis of bolt 85 into a horizontal animal restraining position. The upwardly concave portion 83 is provided to balance bar 80 for easy pivoting without extending the length of the bar beyond the lateral width of the gate.

Similarly, a curved lower restraining support 100 is provided for supporting the lower surface of the animal's neck when the gate is in a closed position. Lower support 100 includes a slender elongated body 102 having a straight section 104 and an upwardly curved section 106. Fastened to the top of straight section 104 is a pan-like structure 108 adapted to engage the lower surface of the animal's neck. Support 100 is pivotally mounted, as at 110, on member 40 below the position of bar 80 for side swinging movements across the space between members 38 and 40 of frame 20. A chain tension member 112 is connected between the end of upwardly curved section 106 of support 100 and side support 24 of frame 20. The length of chain member 112 is such that closing of the gate will result in the pivoting of support about its axis 110 from a downwardly disposed out of the way position into the generally horizontal animal supporting position shown in FIGURE 2 of the drawing.

In the use of the device, members 38, 40 are normally urged into the stock release position shown in FIGURE 3 by means of spring member 76. The animal is led into a chute (not shown) or other suitable structure to which the invention is attached and is positioned so that its neck and head extend through the opening between members 38, 40. A downward pull on handle 68 actuates link plate 50 and connectors 56, 58 to draw members 38, 40 towards each other in surrounding relationship to the animal's neck and head. The members 38, 40 are held in the clamping position of FIGURES 1 and 2 by the latching means described. At the same time, restraining bar 80 and support 100 are swung into the space between members 38, 40 to secure the animal. Release of pawl member 70 from ratchet rack 72 permits the simultaneous movement of members 38, 40, bar 80 and support 100 away from each other into the release position shown in FIGURE 3 when members 71 and 73 are omitted. While the animal is restrained in the manner described, panel sections 34, 36 and 46, 48 prevent it from sticking its legs through the plane of members 38, 40.

It is believed that the invention, its mode of construction and assembly and operation, as well as its advantages should be readily understood from the foregoing without further description, and it should also be manifest that while a preferred embodiment of the invention has been shown and described for illustrative purposes, the structural details are nevertheless capable of wide variation within the purview of the invention as defined in the appended claims.

If desired, member 38 may also be equipped with a latching pawl member 71 engageable with teeth 73 carried on the upper surface of member 26 on the side opposite pulley structure 62. These parts are shown in the drawings for purposes of illustration and they may or may not be included according to the requirements of a particular case. When member 71 is employed as a latch member in the device, both pawl members 70 and 71 must be released from their respective ratchet racks for simultaneous movement of members 38 and 40.

I claim:

1. A stock control gate including a frame having vertical side members and horizontal top and bottom members, an inclined panel section secured to each side member within said frame, a pair of stock engaging members pivotally mounted on the bottom member of and within said frame for movement from an outwardly and upwardly inclined stock release position to a spaced parallel vertical stock control position, said members each surroundingly slidably engaging the top member of said frame, a link plate pivotally mounted on the top member of said frame between said stock engaging members for rocking movements about a horizontal axis in a vertical plane, means connecting the upper end of each of said stock control members to generally diametrically opposed end portions of said link plate whereby upon the rotation of said link plate said stock control members are moved toward or away from each other, spring means connecting said frame and at least one of said stock control members for normally biasing said members away from each other, means mounted on said frame for rotating said link plate, and vertically spaced animal restraining means swingable into and out of the space between said stock engaging members upon the rotation of said link plate, said animal restraining means including an upper restraining bar pivotally mounted on one of said stock engaging members for rocking movements, and a lower animal restraining bar pivotally mounted on the other of said stock engaging members for rocking movements, and a tension member connecting each of said upper and lower bars to said frame whereby to pivot the same into an animal restraining position when said stock engaging members are brought into a stock control position and to pivot them into an animal release position when said stock engaging members are brought into a stock release position.

2. The device of claim 1 wherein said upper and lower bars each include a portion extending outwardly of their respective pivot axes.

3. The device of claim 2 wherein the outwardly extending portions of said upper and lower bars are upwardly curved.

References Cited by the Examiner

UNITED STATES PATENTS

| 1,345,238 | 6/1920 | Raplee. | |
|---|---|---|---|
| 2,113,741 | 4/1938 | Peterson | 119—99 |
| 2,536,236 | 1/1951 | Thomas | 119—147 X |
| 2,703,554 | 3/1955 | Haggard et al. | 119—99 |
| 2,786,449 | 3/1957 | Dahlerup | 119—99 |

SAMUEL KOREN, *Primary Examiner.*

HUGH R. CHAMBLEE, *Examiner.*